US008307093B2

(12) United States Patent
Klemets et al.

(10) Patent No.: US 8,307,093 B2
(45) Date of Patent: Nov. 6, 2012

(54) REMOTE ACCESS BETWEEN UPNP DEVICES

(75) Inventors: Anders E. Klemets, Seattle, WA (US); Srinivas Aiyar, Redmond, WA (US); Edwin A. Heredia, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 12/146,407

(22) Filed: Jun. 25, 2008

(65) Prior Publication Data

US 2009/0327496 A1 Dec. 31, 2009

(51) Int. Cl.
*G06F 15/16* (2006.01)
(52) U.S. Cl. ......... 709/227; 709/223; 713/155; 370/254
(58) Field of Classification Search .................. 709/223, 709/227; 713/155; 370/254
See application file for complete search history.

(56) References Cited

U.S. PATENT DOCUMENTS

| 6,971,005 | B1 * | 11/2005 | Henry et al. .................. 713/155 |
|---|---|---|---|
| 7,065,587 | B2 | 6/2006 | Huitema et al. |
| 7,089,307 | B2 | 8/2006 | Zintel et al. |
| 2003/0110298 | A1 | 6/2003 | Lanigan |
| 2003/0217136 | A1 * | 11/2003 | Cho et al. ...................... 709/223 |
| 2004/0120344 | A1 | 6/2004 | Sato et al. |
| 2004/0133896 | A1 | 7/2004 | Lym et al. |
| 2005/0074018 | A1 | 4/2005 | Zintel et al. |
| 2005/0160172 | A1 | 7/2005 | Eytchison |
| 2005/0185658 | A1 * | 8/2005 | Kamiwada et al. ........... 370/401 |
| 2005/0188193 | A1 * | 8/2005 | Kuehnel et al. ................ 713/155 |
| 2006/0031459 | A1 | 2/2006 | Ahn et al. |
| 2006/0143295 | A1 * | 6/2006 | Costa-Requena et al. .... 709/227 |
| 2006/0153072 | A1 | 7/2006 | Bushmitch et al. |

(Continued)

FOREIGN PATENT DOCUMENTS

WO 2007009877 A1 1/2007

OTHER PUBLICATIONS

Bettstetter, et al "A Comparison of Service Discovery Protocols and Implementation of the Service Location Protocol", 8 Pages, 2000.

(Continued)

*Primary Examiner* — Thomas Dailey
(74) *Attorney, Agent, or Firm* — Lee & Hayes, PLLC

(57) ABSTRACT

A method is provided for allowing Universal Plug and Play (UPnP) technology to be used over the Internet or other wide area communications networks. In one illustrative example, a first UPnP-enabled device is to provide a UPnP service such as streaming media to various users over the Internet. The first UPnP-enabled device provides an on-line identity provider such as Windows Live or the like with user IDs of those users who are authorized to access the first UPnP-enabled device from a remote location. When a user wishes to receive the UPnP service from the first UPnP-enabled device, the user logs in to the on-line identity provider using his user ID and receives from the on-line provider an IP address associated with the first UPnP-enabled device. The user's media player or other application constructs a URL from the IP address and contacts the UPnP-enabled device at that URL. The UPnP-enabled device provides the user with a list of media libraries that are available on it. Finally, the user's media player can invoke the desired UPnP service using content or other information available from the media libraries.

16 Claims, 3 Drawing Sheets

U.S. PATENT DOCUMENTS

| | | |
|---|---|---|
| 2006/0245403 A1 | 11/2006 | Kumar |
| 2006/0282514 A1 | 12/2006 | Saint-Hilaire et al. |
| 2007/0101024 A1 | 5/2007 | Doumuki et al. |
| 2007/0138302 A1 | 6/2007 | Antoniou |
| 2007/0157295 A1 | 7/2007 | Mangalore et al. |
| 2007/0162165 A1 | 7/2007 | Stirbu et al. |
| 2007/0168440 A1 | 7/2007 | Cobelens |
| 2007/0211632 A1 | 9/2007 | Song et al. |
| 2007/0214232 A1 | 9/2007 | Belimpasakis et al. |
| 2007/0214241 A1 | 9/2007 | Song et al. |
| 2007/0233845 A1 | 10/2007 | Song et al. |
| 2007/0239821 A1 | 10/2007 | Huettner |
| 2007/0244578 A1 | 10/2007 | Stirbu |
| 2008/0016255 A1 | 1/2008 | Saint-Hilaire et al. |
| 2008/0120422 A1* | 5/2008 | Park et al. ............... 709/229 |
| 2008/0212495 A1* | 9/2008 | Stirbu .................... 370/254 |
| 2009/0265551 A1* | 10/2009 | Tripunitara et al. ......... 713/168 |

OTHER PUBLICATIONS

Petros Belimpasakis, "Remote Access to Home Services Utilizing Dynamic DNS and Web Technologies", 102 Pages, 2006.

Bobek, "UPNP AV Architecture—Generic Interface Design and Java Implementation" 6 Pages, 2005.

Wikipedia Encyclopedia definition of Universal Plug and Play, downloaded Apr. 28, 2008.

Wikipedia Encyclopedia definition of Domain Name System downloaded Apr. 29, 2008.

Wikipedia Encyclopedia definition of Peer Name Resolution Protocol, downloaded Apr. 29, 2008.

"International Search Report", Mailed Date: Feb. 5, 2010, Application No. PCT/US2009/048709, Filed Date: Jun. 25, 2009, pp. 12. (MS# 322447.02).

* cited by examiner

REMOTE ACCESS BETWEEN UPNP DEVICES

BACKGROUND OF THE INVENTION

Universal Plug and Play (UPnP) technology establishes protocols that allow networked UPnP devices to interact with each other. With UPnP, a device can dynamically join a network, obtain an Internet Protocol (IP) address, convey its capabilities, and learn about the presence and capabilities of other devices. Devices can subsequently communicate with each other directly, thereby enabling discovery and control of devices. Examples of devices that may be configured to implement UPnP protocols include computers, servers, printers, telephones, digital cameras, video recorders, Internet personal appliances, or personal digital assistants.

Typically, one UPnP device acts as a control point and another UPnP device exposes a service to that control point. A control point is an entity on the Local Area Network (LAN) that invokes an action on the service. For example, a control point may request a service to transmit data to the control point. Different categories of UPnP devices are associated with different sets of services and embedded devices. For instance, services within a DVD player are different than those within a printer. The set of services provided by a particular device, as well as a list of properties associated with the particular device, are referred to in device and service description documents that the device must host. Preferably these description documents are written in Extensible Markup Language (XML).

Due to the nature of UPnP service discovery and eventing mechanisms, UPnP technology is limited in that it is only applied to UPnP devices that are connected to a well-controlled LAN environment, where multicasting is supported. That is, UPnP does not enable devices to access one another across network boundaries such as occurs in the Internet, for example.

The increased prevalence of portable networked devices such as portable computers, devices which are usually located on the same network may become separated. For example, a laptop which can access a UPnP-based printer or media server at home will not be able to access those devices when the laptop is at a remote location, such as a coffee shop, for instance.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

A method is provided for allowing Universal Plug and Play (UPnP) technology to be used over the Internet or other wide area communications networks. In one illustrative example, a first UPnP-enabled device is to provide a UPnP service such as streaming media to various users over the Internet. The first UPnP-enabled device provides an on-line identity provider such as Windows Live or the like with user IDs of those users who are authorized to access the first UPnP-enabled device from a remote location. When a user wishes to receive the UPnP service from the first UPnP-enabled device, the user logs in to the on-line identity provider using his user ID and receives from the on-line provider an IP address associated with the first UPnP-enabled device. The user's media player or other application constructs a URL from the IP address and contacts the UPnP-enabled device at that URL. The UPnP-enabled device provides the user with a list of media libraries that are available on it. Finally, the user's media player can invoke the desired UPnP service using content or other information available from the media libraries.

In another illustrative example the contact information for the first UPnP-enabled device is pre-provisioned on a second UPnP-enabled device that is to remotely access the first UPnP-enabled device over the Internet. In this way the need for an on-line third party is eliminated. In one particular implementation the contact information is incorporated in a device description document for the first UPnP-enabled device, which itself is pre-provisioned on the second UPnP-enabled device.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

Figure 1:
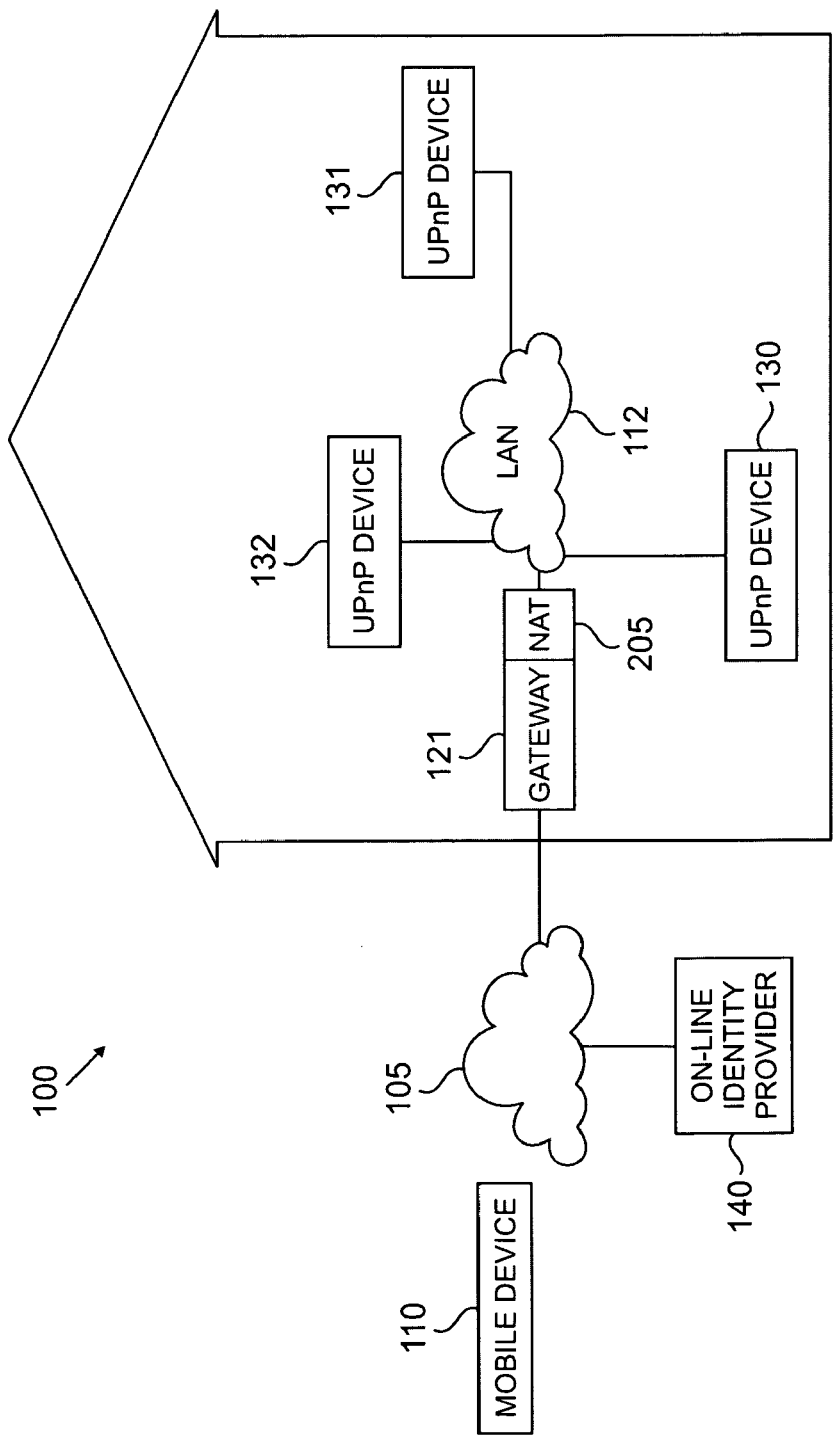
FIG. 1 is a high-level block diagram of one example of an architecture that supports Universal Plug and Play (UPnP) applications on a UPnP mobile device.

FIG. 1 is a high-level block diagram of one example of an architecture that supports Universal Plug and Play (UPnP) applications on a UPnP mobile device 110. UPnP devices 130, 131 and 132, which in this example reside on the same premises, are in communication with another over LAN 112. UPnP devices 130, 131 and 132 can access one another in accordance with conventional UPnP protocols over LAN 112.

A network gateway 121 is provided for establishing communication between devices connected to the LAN 112 and a communications network or WAN 105 that supports multiple data communication protocols. Such a communications network is typically a heterogeneous network, which is a physical network that is made up of multiple logical networks. One example of such a network is the Internet. Mobile device 110 is in communication with the heterogeneous network 105 over a wireless link using a suitable protocol such as IEEE 802.11, for example. In accordance with the techniques described below, mobile device 110 can communicate with any of the UPnP device 130, 131 and 132 using UPnP protocols. In one particular implementation, one of the UPnP devices 130, 131 and 132 is a streaming media server and the mobile device 110 is a laptop that receives and renders the streaming content using a rendering application such as Windows Media Player by Microsoft, Quicktime by Apple, and RealOne players by RealNetworks. While a laptop and streaming media server will be referenced from time to time in the following discussion, the methods and techniques described herein are more generally applicable to any two UPnP devices that wish to establish a remote connection with one another. It should be noted that in some cases a single streaming media server may implement multiple UPnP devices, one for each user of the server. Each UPnP device shares out that user's media library. In other cases, multiple UPnP devices are nested in the manner that will be described below in connection with FIG. 3.

Figure 2:
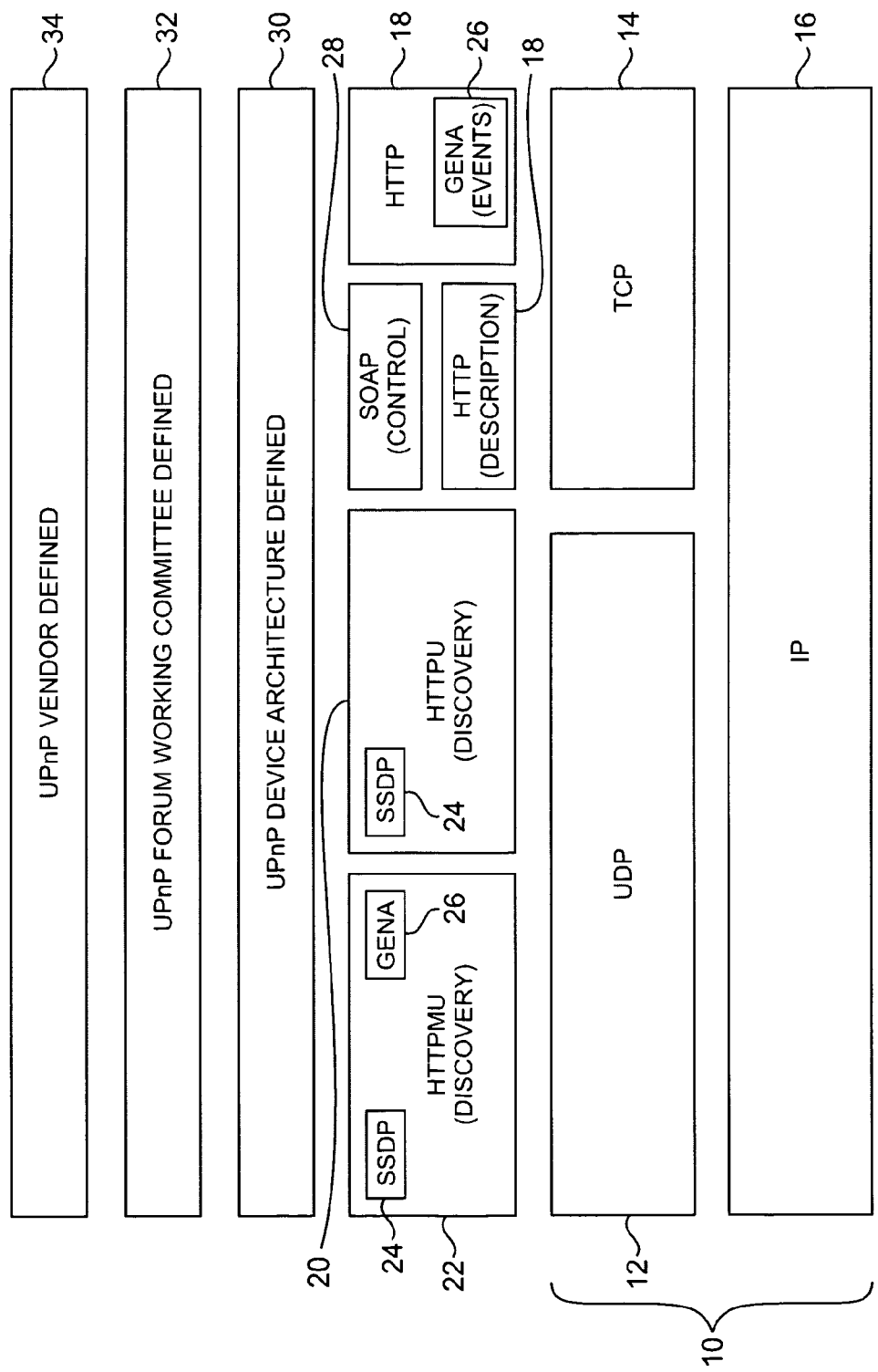
FIG. 2 shows a typical UPnP protocol stack.

The UPnP devices 130, 131 and 132 and mobile device 110 implement a UPnP protocol stack such as shown in FIG. 2. The protocol stack includes a TCP/IP networking protocol stack 10, an HTTP layer 18, an HTTPU (HTTP unicast over User Datagram Protocol (UDP)) layer 20, an HTTPMU (HTTP multicast over UDP) layer 22, an SSDP (Simple Service Discovery Protocol) layer 24, a GENA (General Event Notification Architecture) layer 26, a SOAP (Simple Object Access Protocol) layer 28, a UPnP Device Architecture Defined layer 30, a UPnP Forum Working Committee Defined layer 32 and a UPNP Vendor Defined layer 34. The TCP/IP protocol stack 10 includes an IP layer 16, a TCP layer 14 and a UDP layer 12. The TCP/IP networking protocol stack 10 serves as the base on which the rest of the UPnP protocols are built. UPnP devices can use many of the protocols in the TCP/IP protocol suite including TCP, UDP, IGMP (Internet Group Multicast Protocol), ARP (Address Resolution Protocol) and IP as well as TCP/IP services such as DHCP (Dynamic Host Configuration Protocol) and DNS (Domain Name System). TCP/IP provides the base protocol stack for network connectivity between UPnP devices.

The mobile device 110 or the UPnP devices 130-132 may serve as control points to a UPnP service. As previously described, a UPnP control point (CP) invokes an action on a UPnP service. A control point may discover devices, retrieve device and service descriptions, invoke actions on services, query for state variables, receive events from services, and other like tasks. If one of the UPnP devices 130-132 is a streaming media server, the mobile device 110 serves as a control point that receives and renders streaming media from the server.

Figure 3:
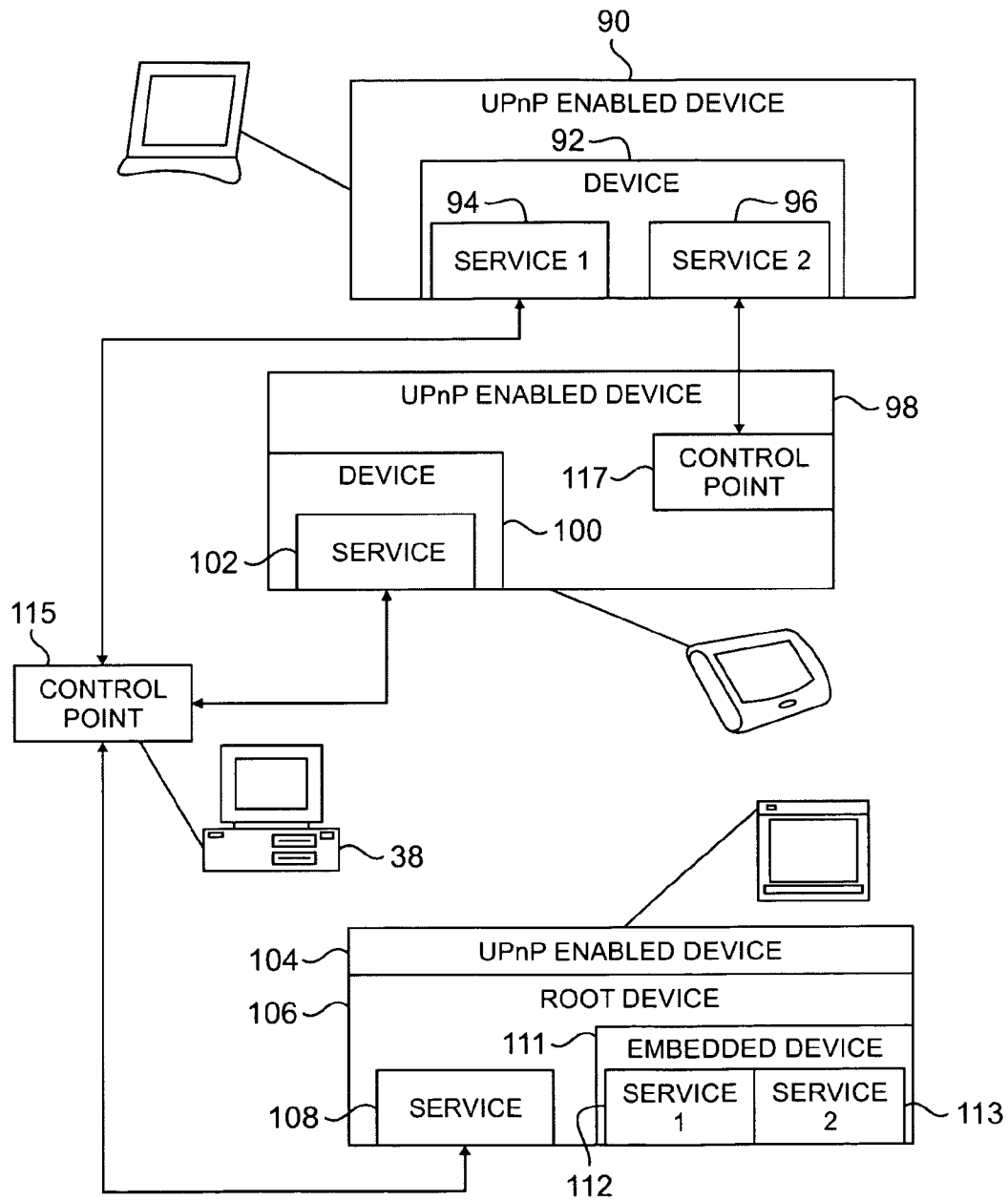
FIG. 3 shows one example of an arrangement in which multiple UPnP devices are nested or embedded in one another.

As shown in FIG. 3 and as mentioned above, in some cases, instead of having a single machine that implements multiple UPnP devices, each UPnP-enabled device may comprise a container of one or more services and optional nested (i.e., embedded) devices and services. For instance, a UPnP device 90 comprises a single device 92 that provides two services 94 and 96, while a UPnP device 98 comprises a single device 100 that provides a service 102, and a UPnP device 104 that includes a root device 106 that provides a service 108 and an embedded device 110 providing services 112 and 114. Different categories of UPnP devices will be associated with different sets of services and embedded devices. Information identifying a given device, its services, and any embedded devices and their services are provided by an XML description document that is hosted by that device.

The smallest unit of control in a UPnP network is a service. A service exposes actions and models its state with state variables. For instance, a clock service could be modeled as having a state variable, current_time, which defines the state of the clock, and two actions, set_time and get_time, which allow control of the service. Similar to the device description, service information is part of an XML service description standardized by the UPnP forum. A pointer (e.g., URL) to these service descriptions is contained within the device description document.

As previously noted, a control point in a UPnP network is a controller capable of discovering and controlling other devices. For example, as shown in FIG. 3, control points include devices used to control other devices, as depicted by a control point 114 (e.g., PC 38), as well as controllers within devices that may be both controlled by other devices, as depicted by a control point 117. After discovery, a control point may: retrieve the device description and get a list of associated services; retrieve service descriptions for interesting services; invoke actions to control the service; and/or subscribe to the service's event source.

The discovery process assumes that a device to be discovered has already obtained an IP address. The manner in which an IP address is obtained in the context of UPnP access over a heterogeneous network will be discussed below, after the discovery process itself is discussed. Discovering UPnP devices involves a search on a network to find at least one device that meets the search criteria, originated by the control point. The universal resource locator (URL) of a UPnP device that matches the search criteria is then sent to the control point in response. The control point then uses this URL to retrieve the device or the service description documents. The device description document is expressed in XML and typically contains device information such as the name of the manufacturer, the model of the device, the serial number, a list of services provided by the device, and a list of embedded devices. The device description document also contains a URL for presentation of the device, and listings for all services, including URLs for control and eventing. The table below shows one example of a device description document, with placeholders in italics for actual elements and values corresponding to a device description.

```
<?xml version="1.0"?>
<root xmlns="urn:schemas-upnp-org:device-1-0">
  <specVersion>
    <minor>1</major>
    <minor>0</minor>
  </specVersion>
  <URLBase>base URL for all relative URLs</URLBase>
  <device>
    <deviceType>urn:schemas-upnp-
    org:device:deviceType:v</deviceType>
    <friendlyName>short user-friendly title</freindlyName>
    <manufacturer>manufacturer name</manufacturer>
    <manufacturerURL>URL to manufacturer site</manufacturerURL>
    <modelDescription>long user-friendly title</modelDescription>
    <modelName>model name</modelName>
    <modelNumber>model number</modelNumber>
    <modelURL>URL to model site</modelURL>
    <serialNumber>manufacturer's serial number</serialNumber>
    <UDN>uuid:UUID</UDN>
    <UPC>Universal Product Code</UPC>
    <iconList>
      <icon>
        <mimetype>image/format</mimetype>
        <width>horizontal pixels</width>
        <height>vertical pixels</height>
        <depth>color depth</depth>
        <url>URL to icon</url>
      </icon>
      XML to declare other icons, if any, go here
    </iconList>
    <serviceList>
      <service>
        <serviceType>urn:schemas-upnp-org:service:
        serviceType:v</serviceType>
        <serviceId>urn:upnp-org:serviceId:serviceId</serviceId>
        <SCPDURL>URL for control</controlURL>
        <controlURL>URL for eventing</eventSubURL>
      </service>
      Declarations for other services defined by a UPnP Forum
      working committee (if any) go here
      Declarations for other services added by UPnP vendor (if any)
      go here
    </serviceList>
    <deviceList>
      Description of embedded devices defined by a UPnP Forum
      working committee (if any) go here
```

-continued

```
    Description of embedded devices added by UPnP vendor (if any)
    go here
    </deviceList>
    <presentationURL>URL for presentation</presentationURL>
    </device>
</root>
```

As previously noted, the conventional UPnP discovery process assumes that the UPnP devices are connected over a single well-controlled LAN environment. The conventional UPnP discovery process does not enable UPnP devices to discover each other when they are on different networks. For example, in FIG. 1, the mobile device 110 cannot discover any of the UPnP devices 130, 131 and 132 using a conventional UPnP discovery process.

In one implementation, this limitation with the conventional UPnP discovery process can be overcome with the assistance of a third party such as the on-line identity provider 140 shown in FIG. 1. Any of the UPnP devices 130, 131 and 132 that wish to offer a UPnP service to the mobile device 110 need to register with the on-line identity provider 140. For purposes of illustration, assume that UPnP device 130 is a streaming media server that wishes to offer streaming media services to the mobile device 110. In this case UPnP device 130 registers with the on-line identity provider 140 and in turn, the on-line identity provider 140 assigns an identifier, referred to herein as a machine ID, to the UPnP device 130.

The on-line identity provider 140 may be offered as an on-line service by any appropriate party. One example of such a service is offered by Windows Live, which can provide a Windows Live ID that may be used as the machine ID. Similarly, Google may also offer a similar service that provides the UPnP device 130 with a Google ID that may be used as the machine ID. In fact, in some cases the UPnP device may have multiple machine IDs each provided by a different on-line identity provider 140.

The UPnP device 130 maintains a list of user IDs employed by each remote user who is authorized to receive UPnP services from it through a remote device such as mobile device 110. It should be noted that the user ID is assigned to individual users and not to the individual devices through which the user will communicate with the UPnP device. The user ID may be any ID that is convenient for user. In some cases this user ID may be one that the user already employs for other purposes, such as a Hotmail ID, for instance.

The UPnP device 130 provides its list of user IDs to the on-line identity provider 140. The UPnP device also publishes one or more of its IP addresses with the on-line identity provider 140. The use of user IDs allows the UPnP device 130 to limit access to the UPnP device 130 to only authorized users. In some implementations, however, user IDs may not be necessary. For instance, in some implementations the machine ID (or the IP address corresponding thereto) may be provided to any user who requests it.

In operation, when an authorized user wishes to receive streaming media (or another UPnP service) from the UPnP device 130, the user logs in to the on-line identity provider 140 using his user ID. Once logged in, the application that is to receive the remote UPnP service, such as a media player in the case of a streaming media service, queries the on-line identity provider 140 for a list of machine IDs that the user is authorized to access. Of course, the user will only receive a machine ID for those UPnP devices that have previously informed the on-line identity provider 140 that this user is in fact an authorized user (in those implementations where a user ID is not required, the machine ID may be provided to any user who requests it and not just authorized users). The application selects one of the machine IDs and requests the on-line identity provider 140 to provide the IP address or addresses that corresponds to that machine ID.

Given the IP address of the UPnP device 130 that is to provide the UPnP service, the application building a URL out of it in some predetermined manner. For instance, if the IP address is 10.1.2.3, the application may construct the URL as https://10.1.2.3:10245/WMPNSSv4/LibraryInfo. The URL allows the user to access a list of media libraries that are available on that UPnP device. The application next sends a GET or POST request to that URL, and the UPnP device 130 responds with an XML document which lists the various media libraries available on that server. For each media library, there are one or more remote URLs. The application can then connect to each remote URL to invoke the UPnP service.

In another implementation, the limitations of the conventional UPnP discovery process can be overcome without the need of an on-line service provider. In this case, however, the UPnP devices that wish to implement remote UPnP access need to have previously been in communication with one another over the same network such as LAN 112 in FIG. 1. This constraint is one that is often met in everyday circumstances. For instance, if the mobile device 110 is a laptop and one of the UPnP devices 130, 131 and 132 is a streaming media server, it will sometimes be the case that the laptop will be used on the same premises to receive streaming media from the server over LAN 112. At some later time, of course, the user may wish to use the laptop from a remote location, requiring it to access the streaming media server over the Internet or other heterogeneous network.

When the laptop and streaming media server first establish communication with one another over the LAN in accordance with UPnP protocols, they can exchange information that allows them to subsequently remotely perform the discovery process over a heterogeneous network. That is, the information is pre-provisioned on the devices. This information includes contact information (e.g. a name or other identifier) that is pre-provisioned on the laptop. At a later time the laptop can use this information to find the IP address of the media server when it wants to establish a UPnP connection over the heterogeneous network.

In one example, the contact information is included in the device description document. Since the laptop and media server have previously established a local UPnP connection over the LAN, the laptop will already have this document in its possession when it wants to establish remote UPnP connectivity over the Internet. For instance, a "remote access URL" may be included in the device description document. This URL can specify the "prefix" (e.g., base URL) which should be used for any UPnP connections to the media server from a remote location. Alternatively, the contact information can include an IP address and port number for the media server. In addition to providing an appropriate contact address, the mere presence of the remote access URL in the device description document indicates that the media server does in fact support remote UPnP connectivity. Of course, the presence of the remote access URL in the device description document does not guarantee that the media server is actually accepting incoming connections from remote locations, since this feature may have been turned off by the user.

The general form of the syntax that may be included in the device description document is as follows:

```
<remoteConfig>
  <remoteUrl>
    https://smith-residence.example.com:10245/WMPNSSv4/library1123/
  </remoteUrl>
  <remoteUrl>
    https://10.1.2.3:10245/WMPNSSv4/library1123/
  </remoteUrl>
</remoteConfig>
```

In this example the syntax shows two "remote access URLs" that could be included in the device description document.

When the client sends a request to the get the list of remote libraries, the XML document returned by the server may have the following syntax:

```
<server>
  <library>
    <UDN>unique device name of this UPnP device</UDN>
    <friendlyName>human-readable name of this
    UPnP device</friendlyName>
    <remoteUrl>
      https://smith-residence.example.com:10245/WMPNSSv4/library1123/
    </remoteUrl>
    <remoteUrl>
      https://10.1.2.3:10245/WMPNSSv4/library1123/
    </remoteUrl>
  </library>
  <library>
    <UDN>unique device name of this UPnP device</UDN>
    <friendlyName>human-readable name of this
    UPnP device</friendlyName>
    <remoteUrl>
      https://smith-residence.example.com:10245/WMPNSSv4/library1124/
    </remoteUrl>
    <remoteUrl>
      https://10.1.2.3:10245/WMPNSSv4/library1124/
    </remoteUrl>
  </library>
</server>
```

In this example the media server implements two UPnP Devices, each of which is sharing out a media library. For each media library, there are two "remote URLs". In addition to "UDN", "friendlyName", and "remoteUrl", there can be other XML tags. For instance, tags such as "modelName", "modelNumber" and "serialNumber" may also be included.

The implementation in which remote access of a UPnP device is accomplished by pre-provisioning information on the remote device may be used by itself or as an adjunct or complement to the implantation in which an online identity provider is employed. For example, pre-provisioning may be used to provide additional IP addresses or it may be used as a backup process if the on-line identity provider is slow or unavailable.

Another problem that arises when the mobile device 110 attempts to establish remote connectivity with a UPnP device that is located on a private network such as LAN 112 is that the UPnP device may have a private (not globally unique) IP address that is only made available to other devices connected to the private network. As a consequence the mobile device 110 will be unable to find the appropriate IP address of a UPnP device connected to a private network. The manner in which this problem is overcome can be illustrated by referring back to FIG. 1. As shown, a Network Address Translator (NAT) 205 is associated with the gateway 121. The NAT 205 has a public IP address that is made available to devices connected to the public, heterogeneous network 105. The NAT 205 also assigns private IP addresses to any devices connected to LAN 112 such as the UPnP devices 130-132. The NAT 205 is designed for IP address simplification and conservation, by enabling a private network (e.g., LAN 112) to use non-registered (private) IP addresses. The NAT 205 operates as a router connecting the private network together with the public network. The NAT 205 translates the private addresses used in the LAN 112 into public IP addresses. As part of this functionality, NAT 205 can be configured to advertise only one public address to the heterogeneous network 105, which public address represents the entire LAN 112.

The NAT 205 allocates a port whenever packets are forwarded to devices which are external to the LAN 112 and allows the allocated port a single external connection. In order to perform this operation, the NAT 205 stores address and port information of the UPnP and other devices connected to the LAN 112 in a routing table. The NAT 205 receives a packet from the public heterogeneous network and compares the destination address and port number in the received packet to those in the routing table. The NAT 205 relays the packet to the device connected to the LAN which corresponds to the destination address and the port number.

While any appropriate NAT technology may be employed by the UPnP devices to perform network address translation, a particularly suitable technology is Teredo, which is described in RFC 4380. Among other things, Teredo is advantageous because it allows an Internet Protocol version 6 (IPv6)-capable device located behind an Internet Protocol version 4 (IPv4) NAT to communicate with external IPv6-capable devices.

The use of a NAT to map private IP addresses to public IP addresses requires the mobile device to know the IP address of the NAT. However, the public IP address assigned to the NAT by an Internet Service Provider can change. Accordingly, the mobile device needs to know the current IP address of the NAT. If the remote access URL were to include the IP address of the UPnP device, this address may have changed by the time the mobile device attempts to remotely connect to one of the UPnP devices. Accordingly, the remote access URL should not include the IP address of the UPnP device. Rather, the remote access URL should include an identifier of the UPnP device such as a name.

The name used in the remote access URL could be a DNS name, such as "smith-residence.example.com." One problem with the use of a DNS name is that the name must be published on a DNS server and the mobile device must use the DNS protocol to resolve the name to an IP address. However, the use of DNS is complicated for the end-user, because publishing a name on a DNS server is often not free, or at least requires some amount of configuration by the user. An alternative protocol that may be employed instead of DNS is the Peer Name Resolution Protocol (PNRP). PNRP is a peer-to-peer distributed name resolution system. It requires no central server, is free and does not need to be configured by the user. When a PNRP name is included in the remote access URL, it looks very much like a DNS name, but it ends with ".pnrp.net". An example of a PRNP name is:
    etworkvc-ttakv7b3b.p070cd7bdb10737ab08dfbf725
        b0e6f4afa988a41.pnrp.net.

In some implementations a Windows Live ID is used in the remote access URL instead of a DNS or PNRP name. The Windows Live ID is normally used in connection with the various Internet services that are made available through the Windows Live products offered by Microsoft.

Another problem that arises when using UPnP to establish remote connectivity is that the UPnP protocol does not provide many security features. Since it is designed for use among devices on a single LAN, all the devices connected to the LAN are assumed to be trusted. A further assumption is that there are no eavesdroppers accessing the LAN. However, when a mobile device remotely connects to another device over a heterogeneous network using the UPnP protocol, security concerns become important. For instance, when a UPnP device receives a connection from a remote location, the device need to determine if it can trust the remote device. Similarly, the remote device need to ensure that it has connected to the correct destination. In addition, protecting the data being communicated between the two devices becomes a serious concern.

To enhance the security of the UPnP connection, in some implementations all UPnP requests are sent over a secure application-level communication protocol such as HTTPS (HTTP with Secure Socket Layer encryption) instead of HTTP (Hypertext Transfer Protocol). HTTPS encrypts all the data. In addition, client side authentication is also employed.

If the case the UPnP Device is a streaming media server, there will also be a streaming transfer connection, which operates independently of the UPnP connection. Within a LAN, the streaming transfer connection or link would normally use either the HTTP or RTSP protocols. However when streaming to a remote device on the Internet or other heterogeneous network, the streaming transfer connection or link may also use HTTPS. For simplicity, in some implementations the streaming media server receives UPnP requests and streaming transfer requests over HTTPS on the same TCP port (e.g., 10245). In other implementations different TCP ports may be used for UPnP requests and streaming transfer requests.

Normally, HTTPS only allows the client (e.g., the mobile device serving as a UPnP Control Point) to authenticate the server (e.g., the streaming media server). This is accomplished by having the server present a public-key certificate. Recently however, HTTPS has been extended to support client-side authentication as well. In this mode, the client is also required to present a cryptographic certificate. This allows both parties to mutually authenticate each other. Accordingly, in some implementations the client-side authentication functionality of HTTPS is employed.

Normally, the certificates are to be signed by a trusted certification authority. For instance, when an on-line identity provider is employed, the certificate may be an SSL certificate provided by the on-line identity provider and signed by the appropriate authority (e.g., Windows Live). The UPnP Device can validate the certificate by checking its signature and will grant access to the client if the user ID is on the list of IDs allowed to access the particular media library. In some implementations, however, such certification authorities are not used since the process of having a certificate signed by an authority might not be free and might require user intervention. Instead, each UPnP Device issues a certificate to itself Such certificates are called self-signed certificates. The client and server authenticate the certificate by comparing it against a list of trusted certificates. The trusted certificates are obtained from the UPnP Devices on the LAN.

In the case of pre-provisioning, as part of the pre-provisioning step during which the device description document is provided to the mobile device, each UPnP Device in some cases may also provide its authentication certificate, which may be issued by the on-line service provider in those instances where such a service provider is employed. Alternatively, a self-signed certificate may be employed. While the certificate may be included in the device description document, this can be problematic because the certificates can be quite large. Instead, it may preferable in some cases to make the certificate available through a new UPnP action in the Content Directory Service or Connection Manager Service, which are UPnP services hosted by UPnP devices. Once the remote device connects using HTTPS, it presents a certificate to the UPnP device, which can be compared against the list of known certificates. To prevent an impostor from using someone else's certificate a private key is associated with each certificate. SSL requires messages to be signed with this private key. An impostor could not use the certificate because they would not know the correct private key.

Since the authentication certificates are pre-provisioned along with the UPnP Device Description Document, not only the streaming media server, but also the mobile device (the UPnP Control Point) must be a UPnP Device. Of course, the mobile device may not need to specify a "Remote Access URL", since, as a control point, it generally will not receive incoming UPnP connections from the server.

In some implementations, instead of presenting SSL certificates for authentication purposes, other types of credentials may be presented such as a username and password, which the party in possession of the credentials must prove it owns at the time the remote connection is established.

As previously mentioned, in the case of pre-provisioning the presence of the remote access URL in the device description document does not guarantee that the media server is actually accepting incoming connections from remote locations, since the this feature may have been turned off by the user. One way to assist the mobile device in determining if remote access is currently enabled is through the Content Directory Service (CDS). The CDS is normally used to enumerate the content (videos, music, pictures, and so forth) that is available on the UPnP device. In the current situation the CDS is extended to allow the mobile device to determine if remote access is currently enabled or disabled. That is, the mobile device is able to invoke a new action to determine the status of the remote access feature. If the status changes, the CDS will send an event notification to the mobile device and any other interested control points. One limitation of this approach is that it only works when both the mobile device and the UPnP device are on the same LAN, but not when they are in remote communication with one another. Accordingly, this technique only provides the mobile device with the last known status of the UPnP device and not its current status. Nevertheless while not conclusive, this information may still prove useful as suggestive of the UPnP device's current status.

The invention claimed is:

1. A method for establishing communication between a Universal Plug and Play (UPnP) control point and a UPnP device over a wide area communications network, the method comprising:

contacting a third party over the wide area communications network to obtain contact information;

accessing the contact information by the UPnP control point, the contact information enabling an authorized user of the UPnP control point to remotely contact the UPnP device over the wide area communications network, the UPnP device storing a list of user identifiers identifying users who are authorized to contact the UPnP device, the list of user identifiers stored in the UPnP device being informed to the third party by the UPnP device before the accessing the contact information, the list of user identifiers identifying the authorized user of the UPnP control point;

receiving a machine identifier corresponding to the UPnP device from the third party that pre-provisions a list of machine identifiers including the machine identifier, the list of machine identifiers indicating UPnP devices that the authorized user is authorized to access;

constructing a network address based on the machine identifier corresponding to the UPnP device;

contacting the UPnP device over the wide area communications network at the network address to establish a network link in accordance with a UPnP protocol; and invoking a service offered by the UPnP device over the network link.

2. The method of claim 1, further comprising requesting and receiving an IP address associated with the machine identifier.

3. The method of claim 1, further comprising pre-provisioning the contact information on the UPnP control point.

4. The method of claim 3, wherein the contact information is included in a device description document for the UPnP device that is pre-provisioned on the UPnP control point.

5. The method of claim 1, wherein the contact information includes a Universal Resource Locator (URL).

6. The method of claim 1, wherein the network link conforms to Hypertext Transfer Protocol over Secure Socket Layer (HTTPS).

7. The method of claim 1, further comprising presenting authentication credentials of the UPnP device to the UPnP control point before invoking the service offered by the UPnP device.

8. The method of claim 1, further comprising receiving authentication credentials from the UPnP device before invoking the service offered by the UPnP device.

9. The method of claim 1, wherein the UPnP control point is a mobile device and the UPnP device is a streaming media server.

10. The method of claim 3, further comprising pre-provisioning the contact information when the UPnP control point and the UPnP device are in communication with one another over a LAN in accordance with the UPnP protocol.

11. The method of claim 10, further comprising receiving from the UPnP device status information indicating whether remote access is enabled or disabled, wherein the status information is received when the UPnP control point and the UPnP device are in communication with one another over the LAN.

12. The method of claim 5, further comprising constructing the URL by combining the network address of the UPnP device with a UPnP service identifier identifying the service offered by the UPnP device.

13. The method of claim 1, wherein the list of user identifiers includes identifiers assigned to authorized users and not assigned to devices that communicate with the UPnP device.

14. A system comprising:
one or more processors; and
one or more computer-readable media including computer-executable instructions that, when executed by the one or more processors, cause the one or more processors to perform acts comprising:
performing a UPnP discovery process to discover a first UPnP device by a UPnP control point of a second UPnP device;
contacting a third party to obtain contact information of the first UPnP device to discover the first UPnP device by accessing the contact information for the first UPnP device, the first UPnP device storing a user identifier assigned to a user of the second UPnP device who is authorized to access the first UPnP device, the first UPnP device being registered with the third party before the second UPnP device contacts the third party;
receiving a machine identifier corresponding to the UPnP device from the third party that pre-provisions a list of machine identifiers including the machine identifier, the list of machine identifiers indicating UPnP devices that the user is authorized to access;
constructing an IP address for the first UPnP device based on the machine identifier corresponding to the UPnP device; and
establishing a UPnP network communication link over a heterogeneous wide area network between the first device and the UPnP control point of the second UPnP device using the contact information based on the IP address for the first UPnP device.

15. The system of claim 14, wherein the UPnP discovery process includes accessing a pre-provisioned device description document that includes the contact information.

16. The system of claim 14, wherein the UPnP discovery process further comprises obtaining a UPnP service identifier identifying a UPnP service offered by the first UPnP device, the method further comprising constructing a URL composed of the IP address and the UPnP service identifier.

* * * * *